(12) United States Patent
Weiland

(10) Patent No.: US 6,610,782 B1
(45) Date of Patent: Aug. 26, 2003

(54) BINARY SILANE EMULSIONS FOR RENDERING ABSORBENT SUBSTRATES WATER REPELLANT

(75) Inventor: Herman G. Weiland, Greensboro, NC (US)

(73) Assignee: Lindley Laboratories, Inc., Burlington, NC (US)

(*) Notice: Subject to any disclaimer, the term of this patent is extended or adjusted under 35 U.S.C. 154(b) by 0 days.

(21) Appl. No.: 09/989,704

(22) Filed: Nov. 20, 2001

(51) Int. Cl.$^7$ .................................................. C08L 83/04
(52) U.S. Cl. ........................ 524/837; 524/838; 528/25; 528/29; 528/34; 528/38
(58) Field of Search ............................ 528/38, 25, 29, 528/34; 524/800, 837, 838

(56) References Cited

U.S. PATENT DOCUMENTS

| | | | |
|---|---|---|---|
| 2,683,674 A | 7/1954 | Hatcher et al. ............. 177/123 |
| 3,576,779 A | 4/1971 | Holdstock et al. .......... 260/29.2 |
| 3,772,065 A | 11/1973 | Seiler ........................ 117/123 |
| 3,832,203 A | 8/1974 | Saunders et al. ............ 106/287 |
| 4,175,159 A | 11/1979 | Raleigh ...................... 428/405 |
| 4,228,054 A | 10/1980 | Ona et al. ................... 260/29.2 |
| 4,277,382 A | 7/1981 | Lin et al. .................... 260/29.2 |
| 4,342,796 A | 8/1982 | Brown et al. ............... 427/136 |
| 4,433,013 A | 2/1984 | Puhringer ................... 427/337 |
| 4,448,694 A | 5/1984 | Plueddemann .............. 210/682 |
| 4,476,281 A | 10/1984 | Vaughn, Jr. ................. 524/767 |
| 4,476,282 A | 10/1984 | Koerner et al. ............. 524/837 |
| 4,496,687 A | 1/1985 | Okada et al. ................ 524/859 |
| 4,517,375 A | 5/1985 | Schmidt ...................... 566/463 |
| 4,525,213 A | 6/1985 | Linn ............................ 106/2 |
| 4,552,910 A | 11/1985 | Deubzer et al. ............. 524/43 |
| 4,559,227 A * | 12/1985 | Chandra et al. ............ 510/122 |
| 4,584,125 A | 4/1986 | Griswold et al. ........... 252/358 |
| 4,648,904 A | 3/1987 | DePasquale et al. ......... 106/2 |
| 4,877,654 A | 10/1989 | Wilson ........................ 427/387 |
| 4,894,412 A * | 1/1990 | Okada et al. ................ 524/714 |
| 4,990,377 A | 2/1991 | Wilson ........................ 427/387 |
| 5,063,260 A | 11/1991 | Chen et al. .................. 523/213 |
| 5,196,054 A | 3/1993 | Schmuck et al. .............. 106/2 |
| 5,244,598 A | 9/1993 | Merrifield et al. .......... 252/314 |
| 5,399,191 A | 3/1995 | Mayer et al. ............ 106/287.11 |
| 5,626,660 A | 5/1997 | Lautenschlager et al. ................... 106/287.11 |
| 5,726,241 A | 3/1998 | Maruyama et al. ......... 524/837 |
| 5,852,110 A * | 12/1998 | Gee ............................ 524/837 |
| 5,965,664 A * | 10/1999 | Lindley et al. ............. 524/838 |
| 6,090,885 A * | 7/2000 | Kuo et al. ................... 524/838 |
| 6,201,063 B1 * | 3/2001 | Halloran et al. ............ 524/838 |
| 6,294,608 B1 * | 9/2001 | Hager et al. ................ 524/838 |
| 6,403,163 B1 * | 6/2002 | Fisher et al. ................ 427/387 |

FOREIGN PATENT DOCUMENTS

| | | | |
|---|---|---|---|
| DE | 2800016 | 7/1979 | |
| GB | 1502322 | 3/1978 | |
| JP | 59080478 A * | 5/1984 | ........... C08L/83/04 |

OTHER PUBLICATIONS

Emulsions: The Theory and Practice by Paul Becher; Copyright 1957.
Silicon Esters by Barry Arkles; Reprinted from Encyclopedia of Chemcial Technology, 4$^{th}$ Edition, vol. 22.
Gelst–Silicone Fluids: Stable, Inert Media from Gelst, Inc. Copyright 1998.
Special Coverage:Composites and Plastics from NASA Tech Briefs, May 2001.
Polyorganosiloxane Waterproofing for Porous Ceramics from NASA Tech Briefs, May 2001.
Functional Silicone Reactivity Guide; undated.
Gelest–Silicone Coatings, Encapsulants, Gels from Gelest, Inc.; undated.
Product Range; Silanes, from Degussa–Huls AG; undated.

* cited by examiner

Primary Examiner—Robert Dawson
Assistant Examiner—Marc S Zimmer
(74) Attorney, Agent, or Firm—MacCord Mason PLLC

(57) ABSTRACT

An aqueous silane composition for increasing the resistance to penetration by aqueous media of an absorbent substrate is disclosed. The compositions are made from effective amounts of ingredients that initially include: a hydrolyzable silane; a low molecular weight silicone; an amino-functional silicone; an amino-functional silane; and the balance of water. The aqueous silane compositions are characterized by increased shelf-life, increased depth of penetration; and the ability to be made in high concentrations that facilitate lower shipping costs, while at the same time, being dilutable for application to masonry.

91 Claims, 3 Drawing Sheets

BINARY SILANE EMULSIONS FOR RENDERING ABSORBENT SUBSTRATES WATER REPELLANT

BACKGROUND OF THE INVENTION

1. Field of the Invention

The present invention relates generally to aqueous silane compositions and, more particularly, to aqueous silane compositions for use in making absorbent surfaces, such as masonry, water repellent.

2. Description of the Prior Art

Aqueous silane compositions have become important for making absorbent surfaces, such as masonry, water repellent. U.S. Pat. No. 5,965,644 issued to the assignee of the present application, in the names of Lindley, et al. on Oct. 12, 1999 and entitled "High Concentration Silane Emulsions For Rendering Absorbent Substrates Water Repellent" describes aqueous silane compositions for use in making absorbent surfaces, such as masonry, water repellent. The entire disclosure of U.S. Pat. No. 5,965,644 is hereby incorporated by reference.

However, the known aqueous silane compositions are in some respects in need of improvement. Often, the water concentration required to obtain a stable aqueous silane composition adds significantly to the cost of shipping. When stable low water concentration aqueous silane compositions are obtainable, their shelf life is often unacceptable since the components readily segregate into zones having different water concentrations. These segregated zones in time become layered.

The segregated compositions are not remixed readily into a homogenous aqueous silane composition. Dilutions are often used to adjust a water content of the aqueous silane compositions to levels appropriate for use with absorbent substrates to render them water repellant. Such dilution of inhomogeneous aqueous silane compositions using water additions often do not get rid of the segregation. Thus, segregated aqueous silane compositions are discarded as waste.

Another deficiency of known aqueous silane compositions is the depth of impregnation for example of masonry in the building sector. The deeper an aqueous silane composition penetrates into masonry, the better the water impermeability of treated masonry. In situations involving spatting and chipping, water impermeability is maintained when the depth of penetration exceeds the depth of spalling and chipping. Also, deeper penetration provides better water impermeability in driving rain conditions. However, the depth of penetration for impregnations leaves something to be desired in many current aqueous silane compositions.

The following discussion is generally taken from U.S. Pat. Nos. 4,877,654 and 4,990,377 to Wilson. The entire disclosures of Wilson '654 and '377 are hereby incorporated by reference.

The utility of silanes, especially alkoxysilanes, as masonry water repellents is widely known. Compositions currently in use employ solutions of silanes in various organic solvents such as alcohol, e.g., U.S. Pat. Nos. 3,772,065, to Seiler and 4,342,796, to Brown et al. or hydrocarbons, e.g., 4,525,213 to Linn. Principal limitations of such solvent type compositions include the toxicity and the flammability of the solvents employed.

Aqueous silane compositions that are non-toxic and non-flammable have become important as effective masonry water repellent compositions. See, U.S. Pat. Nos. 4,433,013, to Puhringer, 4,517,375 to Schmidt and 4,648,904 to DePasquale and U.S. Pat. Nos. 4,877,654 and 4,990,377 to Wilson. Such compositions can have an important drawback, however, in that the pH may tend to drift and then the silane reacts with water and hydrolyses. See, e.g., U.S. Pat. Nos. 2,683,674 to Hatcher et al. and 4,175,159, to Raleigh. This reduces efficacy by reducing the content of active, water-repellent ingredient. Moreover, the pH of the system may shift when additives are included such as a biocide, which is commonly added to retard growth of fungi and the like.

Although the stability of the water-containing emulsions has been enhanced to some extent by refrigerating them, or the problem of reduced efficacy can be avoided by using the emulsions soon after preparation, both expedients are not cost-effective and may in some cases cause waterproofing contractors to go back to the above-mentioned solvent borne, non-aqueous compositions.

In some cases, the pH of the system has been adjusted to increase the rate of resin formation, see e.g., U.S. Pat. Nos. 4,552,910 to Deubzer et al. and 4,228,054, to Ona et al. Wilson, in U.S. Pat. No. 4,877,654 teaches that by selecting appropriate silanes (largely water insoluble) and appropriate emulsifiers, water-based, normally hydrolysable silane emulsions may be prepared that are hydrolytically stable if the pH is maintained in a predetermined pH stable range, typically 6–8, with a buffering compound such as sodium bicarbonate. However, Wilson only teaches concentrations of less than about 60 percent and, in fact, his preferred compositions are about 40 percent. Significant savings in packaging and shipping could be obtained if the concentration could be increased since most of the current products are water which could easily be re-added at the site where the composition is being applied.

Thus, there remains a need for a new and improved aqueous silane compositions for use in making absorbent surfaces, such as masonry, water repellent which is hydrolytically stable for a long period without necessarily requiring a separate buffering compound while, at the same time, may be prepared in much higher concentrations to reduce packaging and shipping costs.

SUMMARY OF THE INVENTION

The present invention is directed to an aqueous silane composition for increasing the resistance to penetration by aqueous media of an absorbent substrate. The composition is made from effective amounts of ingredients including: a hydrolyzable silane; a low molecular weight silicone; an amino-functional silicone; an amino-functional silane; and the balance of water.

An amino functional silane that has been reacted with a non-ionic emulsifier may used in amounts of about 0.5 weight percent of the composition. The non-ionic emulsifier used in the reaction preferably includes one having reactive hydroxyl groups. For example the non-ionic emulsifier may be an ethoxylated alkyl phenol.

Alternatively, a non-ionic emulsifier may be directly added to the composition. In this case, the non-ionic emulsifier may be directly added to the composition and may be between about 2 and 3 percent by weight of the composition.

The hydrolyzable silane is an alkyl-silane, preferably an alkoxy-silane such as octyl-triethoxy-silane, hexadecyl-triethoxy-silane, hexyl-triethoxy-silane and hexyl-trimethoxy-silane.

A combination of the hydrolyzable silane and the low molecular weight silicone may be between about 0 and 90 percent by weight, preferably between about 30 and 90 percent by weight, and more preferably between about 35 and 75 percent by weight, of the composition.

The low molecular weight silicone may be between about 10 and 90 percent by weight of active components of the composition ({Silicone(s) and Silane(s)} e.g., hydrolyzable silane and low molecular weight silicone; or hydrolyzable silane, low molecular weight silicone and amino-functional silicone; or hydrolyzable silane, low molecular weight silicone, amino-functional silicone and amino-functional silane . . . etc. depending on which are present in the composition). Preferably, the low molecular weight silicone may be between about 20 and 80 percent by weight of the active components of the composition. More preferably, the low molecular weight silicone is between about 40 and 65 percent by weight of the active components of the composition.

The low molecular weight silicone may be represented by the formula:

$$R^1_x R^2_{3-x} SiO-[SiR^1 R^2 O]_n-SiR^1_x R^2_{3-x},$$

where $R^1$ is any one of H, —$(CH_2)_y(CH_3)$ y=0,1,2, or 3, —$CH(CH_3)_2$, and
—$(CH_2)_y CH(CH_3)_2$ y=0,1,2, or 3;
$R^2$ is any one of —$O(CH_2)_x CH_3$ x=0,1,2, or 3 and
—$O(CH_2)_y CH(CH_3)_2$ y=0,1,2, or 3; and
n is an effective value. Although not fully knowing the range of effective values for n, applicant believes that the range of effective values for n is low, such as, n=0,1,2,3, or 4.

Preferably, the low molecular weight silicone is represented by the formula:

$$R^1_x R^2_{3-x} SiO-[SiR^1 R^2 O]_n-SiR^1_x R^2_{3-x}$$

where $R^1$ is any one of —$(CH_2)_y(CH_3)$ y=1, 2, or 3, —$CH(CH_3)_2$, and
—$(CH_2)_x CH(CH_3)_2$ x=1,2, or 3;
$R^2$ is any one of —$OCH_2 CH_3$ (ethoxy) and
—$O(CH_3)$ (methoxy); and
n is an effective value. Although not fully knowing the range of effective values for n, applicant believes that the range of effective values for n is low, such as, n=0,1,2,3, or 4.

Specific examples of the low molecular weight silicone include:

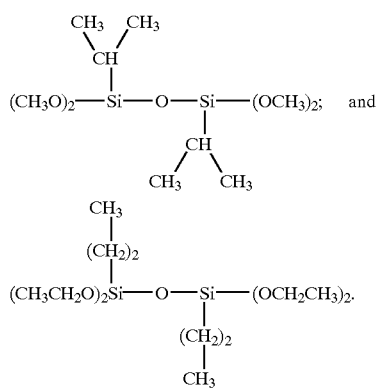

The amine value of the amino-functional silicone or siloxane may be in the composition in an amount between about 50 and 100 mg KOH/gm, preferably about 70 mg KOH/gm. The amino-functional siloxane may be about 0.5 percent by weight of the composition.

The present invention also provides a method for increasing the resistance to penetration by aqueous media of an absorbent substrate by applying to the surface of the substrate the composition as above defined and allowing the composition to cure.

Mention is made of embodiments of this invention involving compositions and use of such compositions as defined above including an effective amount of a biocide.

Accordingly, one aspect of the present invention is to provide an aqueous silane composition, the composition initially comprising effective amounts of: a hydrolyzable silane; a low molecular weight silicone; and the balance of water.

Another aspect of the present invention is to provide a low viscosity aqueous silane composition, the composition initially comprising effective amounts of: a hydrolyzable silane; a low molecular weight silicone; an amino-functional silicone; and the balance of water.

Still another aspect of the present invention is to provide an aqueous silane composition for increasing the resistance to penetration by aqueous media of an absorbent substrate, the composition initially comprising effective amounts of: a hydrolyzable silane; a low molecular weight silicone; an amino-functional silicone; an amino-functional silane; and the balance of water.

These and other aspects of the present invention will become apparent to those skilled in the art after a reading of the following description of the preferred embodiment when considered with the drawings.

DESCRIPTION OF THE PREFERRED EMBODIMENTS

Figure 1:
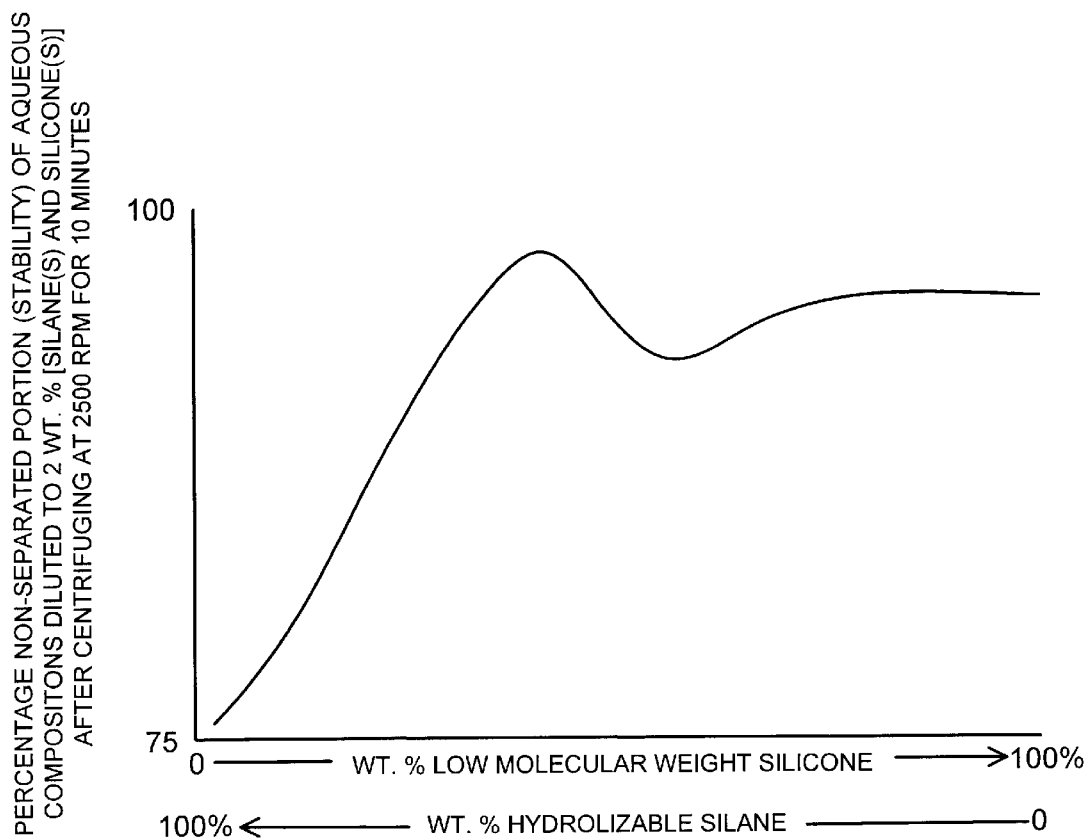
FIG. 1 is a graphical representation of stability after dilution to 2% and centrifuging at 2500 RPM for 10 minutes data for aqueous silane compositions to an embodiment of the present invention.

The present invention is particularly suited to a method for increasing the resistance to penetration by ambient moisture of an absorbent substrate, such as masonry.

By the term "masonry" used herein, is meant any absorbent inorganic substrate, particularly building compositions and including but not limited to structural ceramics such as brick such as but not limited to any one of axed brick or rough-axed brick, beam brick, chrome-magnesia brick, common brick, dovetail brick, enameled brick, face brick or facing brick, firebrick or firebrick, molded brick, paving brick, perforated brick, pressed brick, sand-lime brick, semi silica brick, and silica brick; drain tile; a block such as a solid mass of stone or a building composition with a number of faces that may be flat such as but not limited to any one of a burster block, cinder block and a hollow building block; conduits; roofing tile; flue lining; cement such as but not limited to any one of aluminate cement such as high-alumina cement or high-speed cement, fire cement, masonry cement, neat cement, oxychloride cement, Parian cement, phosphate cement, Portland cement, silicate cement, refractory cement, slag cement, and white cement; concrete such as but not limited to any one of architectural concrete, cyclopean concrete, fibrous concrete, heavyweight concrete, lightweight concrete, plain concrete, precast concrete, prestressed concrete, and reinforced concrete; calcined gypsum products, e.g., molding and building plaster and stucco, magnesia cement, insulation products such as electrical and thermal insulators (diatomaceous earth brick) and porcelain spark plugs, etc.

The masonry materials also include stone, tile, artificial stone, adobe, concrete and reinforced concrete such as found in roadways, bridge decks, airport runways, parking garage decks, and other concrete building structures.

The masonry materials that can be treated in accordance herewith are preferably dry when treated with the water repellent compositions, although they may be wet. In the case of settable masonry materials, the compositions of the present invention may be incorporated in the preset mixture, for example, into a concrete mix prior to casting and setting.

The water-based compositions of the present invention preferably include a hydrolyzable silane, for example, one with a molecular weight up to about 600 (or essentially a multiple thereof, if oligomerized) and the general formula of $R_n$—Si—$(R^1)_{4-n}$, wherein R is a $C_1$–$C_{30}$ hydrocarbyl or halogenated hydrocarbyl group, $R^1$ is a $C_1$–$C_6$ alkoxy, halide, amino, carboxyl, or a mixture of any of the foregoing, and n is 1 or 2. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. One or more of such halogen substituents may be present in the R group. The $R^1$ group can comprise $C_1$–$C_6$ alkoxy, halogen, amino, or carboxylate group. Thus, among the alkyl groups useful as $R^1$ are methyl, ethyl, n-propyl, isobutyl and isopropyl. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes, as are well known in the art. The hydrolyzable silanes can range widely in amount. However, typically the amount can comprise between about 10 and 90 percent by weight of active components of the composition, and preferably between about 20 and 80 percent by weight and especially between about 35 and 60 percent.

Silanes especially useful in accordance with the present invention generally have a molecular weight in excess of 135 and preferably greater than 190 up to about 600 for the monomers. The dimers and trimers present in the composition will, of course, have essentially multiples of the molecular weights of the single specie of silane or silanes being used. It should be noted that mixtures of various silanes may be used, if desired.

Specific examples of silanes useful in accordance with the present invention include, but are not limited to, methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-trifluro hexyltrimethoxysilane, cyclohexyltrimethoxysilane, benzyltrimethoxysilane, 4-chlorobenzyltriethoxysilane, 4-bromobenzyltri-npropoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them and the like, alone, and in admixture with dimers, trimers and other oligomers thereof. These silanes materials may be commercially available from, for example, Degussa-Hül AG that deals with Sivento® Silanes; Gelest, Inc; Lancaster Synthesis following its acquisition of, among other things, the silanes PCR Inc. of Florida, USA, Advanced Polymer, Inc. and Dow Corning.

The low molecular weight silicone may be between 10 and 90 percent by weight of active components of the composition. Preferably, the low molecular weight silicone may be between about 20 and 80 percent by weight of active components of the composition. More preferably, the low molecular weight silicone is between about 40 and 65 percent by weight of active components of the composition.

The low molecular weight silicone may be represented by the formula

where $R^1$ is any one of H, —$(CH_2)_w(CH_3)$ w=0,1,2, or 3, —$CH(CH_3)_2$, and —$(CH_2)_x CH(CH_3)_2$ x=0,1,2, or 3;

$R^2$ is any one of —$O(CH_2)_y CH_3$ y=0,1,2, or 3 and —$O(CH_2)_z CH(CH_3)_2$ z=0,1,2, or 3; and n is an effective value. Although not fully knowing the range of effective values for n, applicant believes that the range of effective values for n is low, such as, n=0, 1, 2, 3, or 4.

Preferably, the low molecular weight silicone is represented by the formula:

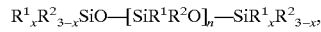

where $R^1$ is any one of —$(CH_2)_y(CH_3)$ y=1, 2, or 3, —$CH(CH_3)_2$, and —$(CH_2)_y CH(CH_3)_2$ y=1,2, or 3;

$R^2$ is any one of —$OCH_2CH_3$ (ethoxy) and —$O(CH_3)$ (methoxy); and n is an effective value. Although not fully knowing the range of effective values for n, applicant believes that the range of effective values for n is low, such as, n=0, 1, 2, 3, or 4.

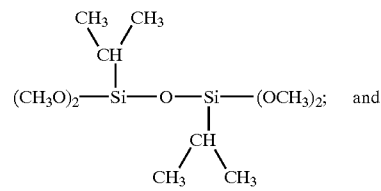

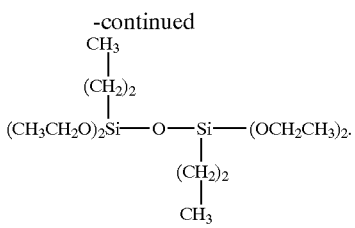

These silicone materials may be commercially available from, for example, Degussa-Hül AG that deals with Sivento® Silanes; Gelest, Inc; Advanced Polymer, Inc. and Dow Corning.

The amine value of the amino-functional silicone or siloxane may be in the composition in an amount between about 50 and 100 KOH mg/gm, preferably about 70 KOH mg/gm. The amino-functional siloxane may be about 0.5 percent by weight of the composition.

An amino functional silane that has been reacted with a non-ionic emulsifier may used in amounts of about 0.5 weight percent of the composition. The non-ionic emulsifier used in the reaction preferably includes one having reactive hydroxyl groups. For example the non-ionic emulsifier may be an ethoxylated alkyl phenol.

Alternatively, a non-ionic emulsifier may be directly added to the composition. In this case, the non-ionic emulsifier may be directly added to the composition and may be between about 2 and 3 percent by weight of the composition.

A wide variety of emulsifiers have been tried or are expected to be useful in the present invention. Nonionic, anionic, cationic and amphoteric emulsifiers are well known from the state of the art. The preferred emulsifiers are, however, nonionic. The concentration of emulsifier or emulsifiers used in accordance with the present invention may range widely, but preferably is about 3.5 wt. % of the total weight of the composition.

In general, those emulsifiers or emulsifier blends which have an Hydrophilic-Lipophilic Balance (HLB) in the range between about 1.5 and 20, and preferably in the range between about 4 and 17 may be used herein. The proper HLB value for a given silane or silane mixture may be determined experimentally in order to ascertain the optimum stability.

In the Hydrophilic-Lipophilic Balance (HLB) system, surfactants are characterized according to the "balance" between the hydrophilic ("water-loving") and lipophilic ("oil-loving") portions of their molecules. The HLB value indicates the polarity of the molecules in an arbitrary range of 1–40, with the most commonly used emulsifiers having a value between 1 and 20. The HLB value increases with increasing hydrophilicity. According to the HLB value, surfactants may be utilized for different purposes: antifoaming agent between about 1 and 3; emulsifier, water-in-oil, have a HLB value range of between about 3 and 6; wetting agent have a HLB value range of between about 7 and 9; emulsifier, oil-in-water a HLB value range of between about 8 and 18; detergents have a HLB value range of between about 13 and 15; and solubilizer have a HLB value range of between about 15 and 20.

In the Hydrophilic-Lipophilic Balance (HLB) system, oils also have HLB values assigned; however, this "HLB" is relative as to whether an oil-in-water or water-in-oil emulsion is to be stabilized. Emulsifiers should have similar HLB values to that of the respective oils in order to achieve maximum stabilization. Mineral oil has an assigned HLB value of about 4 when a water-in-oil emulsion is desired, and a value of about 10.5 when an oil-in-water emulsion is to be prepared. Accordingly, the HLB value of the emulsifier should also be around about 4 and about 10.5, respectively. The desired HLB value may be achieved by mixing lipophilic and hydrophilic surfactants. The overall HLB value of the mixture is calculated as the sum of the fraction*individual HLB. For example: a mixture of 30% Span 80 (HLB=4.3) and 70% Tween 80 (HLB=15) has an overall HLB value of:

HLB=(0.3*4.3)+(0.7*15)=11.8.

The Hydrophilic-Lipophilic Balance (HLB) system for surfactants is based on molecular structure and therefore may be used to predict the behavior of single molecules. HLB values is determined experimentally by techniques known to those skilled in this art, for example, those set forth in the pamphlet "The HLB System" published by ICI Americas, Inc., Wilmington, Del., U.S.A. See also the publication "Adjuvants for Herbicides", Weed Society of America, Champaign, Ill., U.S.A.

If the HLB value of an emulsifier is below 1.5, it is expected that it will not be useful in this invention because it will not produce a stable oil-in-water emulsion. If, on the other hand, the HLB value is above about 20, it also is expected not be useful because stability is poor. HLB values in the range of between about 4 and 17 are preferred because they provide the most stable emulsions of the above-mentioned silanes.

Specific examples of emulsifying agents which may be used in accordance herewith include, but are not limited to the following with the HLB value given in parenthesis following the name: sorbitan trioleate (1.8), sorbitan tristearate (2.1), polyoxyethylene sorbitol hexastearate (2.6), glycerol monostearate (3.8), sorbitan monooleate (4.3), sorbitan monostearate (4.7), polyoxyethylene (2 mole) stearyl ether (4.9), sorbitan monopalmitate (6.7), polyoxypropylene mannitol dioleate (8), polyoxyethylene sorbitol oleate (9.2), polyoxyethylene stearate (9.6), polyoxyethylene sorbitan monooleate (10.0), polyoxyethylene monooleate (11.4), polyoxyethylene (6 mole) tridecyl ether (11.4), polyoxyethylene (10 mole) cetyl ether (12.9), polyoxyethylene sorbitan monooleate (15), polyoxyethylene (20 mole) stearyl ether (15.3), polyoxyethylene (15 mole) tridecyl ether (15.4), polyoxyethylene alkylamine (cationic, 15.5); polyoxyethylene alcohols having an HLB of 9.7, about 10, and 11.6; ethoxylated nonylphenols having HLB values of 10, 11 and 12; dialkylphenol ethoxylates having an HLB value of 10.6; block copolymers of ethylene oxide and propylene oxide having HLB values in the range between about 5.5 and 15; ethoxylated octyl phenols having an HLB of about 13.5, 17.3, and 17.9; fatty acid glycerides having an HLB value of approximately 4, sodium lauryl sulfate, sodium oleate, mixtures of any of the foregoing, and the like.

Polyoxyethylene alcohols; ethoxylated nonyl phenols; dialkyl phenol ethoxylate; block copolymers of ethylene oxide and propylene oxide; fatty acid glycerides; sorbitan fatty acid esters; polyoxyethylene sorbitan fatty acid esters; blends of sorbitan esters with polyoxethylene amines; polyvinyl alcohol; and blends of octylphenolpolyoxyethylene ethanol are just some example of emulsifying agents. The emulsifying agents, given in Table 1 below, may be expected to provide especially useful emulsions of silanes.

TABLE 1

| CHEMICAL SUPPLIER | PRODUCT AND CHEMICAL NAME | HLB | PRODUCT CODE | CAS NO. |
|---|---|---|---|---|
| | Span 20 ($C_{18}H_{34}O_6$) (346.463) [1338-39-2] | | | |
| Nihon Surfactant Kogyo K. K. | SL-10 Sorbitan Monolaurate | 8.6 | SL-10 | 1338-39-2 |
| Lancaster Synthesis Inc. | Sorbitan Monolaurate ($C_{18}H_{34}O_6$) | — | 12099 | 1338-39-2 |
| TCI America | Span #20 Sorbitan Monolaurate | — | S0059 | 1338-39-2 |
| Pfaltz & Bauer, Inc. | Span 20 Sorbitan Monolaurate | — | S07943 | 1338-39-2 |
| Soltec Ventures, Inc. | Span 20 Sorbitan Monolaurate | — | S101 | 1338-39-2 |
| | Span 40 ($C_{22}H_{42}O_6$) (402.5702) [26266-57-9] | | | |
| Nihon Surfactant Kogyo K. K. | SP-10 Sorbitan Monopalmitate | 6.7 | SP-10 | 26266-57-9 |
| Pfaltz & Bauer, Inc. | Sorbitan Monopalmitate | — | S07945 | 26266-57-9 |
| TCI America | Span #40 Sorbitan Monopalmitate | — | S0061 | 26266-57-9 |
| Spectrum Quality Products, Inc. | Sorbitan Monopalmitate | — | SPA40 | 26266-57-9 |
| | Span 60 ($C_{24}H_{46}O_6$) (430.6238) [1338-41-6] | | | |
| Nihon Surfactant Kogyo K. K. | SS-10 Sorbitan Stearate | 4.7 | SS-10 | 1338-41-6 |
| Pfaltz & Bauer, Inc. | Sorbitan Monostearate | — | S07946 | 1338-41-6 |
| TCI America | Span #60 Sorbitan Monostearate | — | S0062 | 1338-41-6 |
| Lancaster Synthesis Inc. | Sorbitan Monostearate | — | 11435 | 1338-41-6 |
| Spectrum Quality Products, Inc. | Sorbitan Monostearate (F.C.C.) | — | S1318 | 1338-41-6 |
| | Span 80 ($C_{24}H_{44}O_6$) (428.608) [1338-43-8] | | | |
| Nihon Surfactant Kogyo K. K. | SO-10R Sorbitan Monooleate | 5.0 | SO-10R | 1338-43-8 |
| Nihon Surfactant Kogyo K. K. | SO-10 Sorbitan Monooleate | 4.3 | SO-10 | 1338-43-8 |
| ICN Biomedical Research Products | Sorbitan Monooleate | — | 198996 | 1338-41-8 |
| TCI America | Span #80 Sorbitan Monooleate | — | S0060 | 1338-41-8 |
| Spectrum Quality Products, Inc. | Sorbitan Monooleate | — | SPA80 | 1338-41-8 |
| | Triton(R) X-100 ($C_{16}H_{26}O_2$) 250.3802 [9002-93-1] | | | |
| Nihon Surfactant Kogyo K. K. | OP-30 POE(30) Octyl Phenyl Ether | 20.0 | OP-30 | 9002-93-1 |
| Nihon Surfactant Kogyo K. K. | OP-10 POE(10) Octyl Phenyl Ether | 16.5 | OP-10 | 9002-93-1 |
| Nihon Surfactant Kogyo K. K. | OP-3 POE(3) Octyl Phenyl Ether | 6.0 | OP-3 | 9002-93-1 |
| Acros Organics — International | TRITON ® X-100 $C_{16}H_{26}O_2$ | — | 21568 | 9002-93-1 |
| Research Organics | TRITON X-100 $C_{16}H_{26}O_2$ | — | 3103T | 9002-93-1 |
| Spectrum Quality Products, Inc | TRITON ® X-100 $C_{16}H_{26}O_2$ | — | TR135 | 9002-93-1 |
| Lancaster Synthesis Inc | TRITON ® X-100 $C_{16}H_{26}O_2$ | — | 13767 | 9002-93-1 |
| | POE(10) Behenyl Ether [26636-40-8] | | | |
| Nihon Surfactant Kogyo K. K. | BB-30 POE(30) Behenyl Ether | 18.0 | BB-30 | 26636-40-8 |
| Nihon Surfactant Kogyo K. K. | BB-20 POE(20) Behenyl Ether | 16.5 | BB-20 | 26636-40-8 |
| Nihon Surfactant Kogyo K. K. | BB-10 POE(10) Behenyl Ether | 10.0 | BB-10 | 26636-40-8 |
| Nihon Surfactant Kogyo K. K. | BB-5 POE(5) Behenyl Ether | 7.0 | BB-10 | 26636-40-8 |
| Nihon Surfactant Kogyo K. K. | DOP-8N Sodium POE(8) Oleyl Ether Phosphate | 12.5 | DOP-8N | 57486-09-6 |
| | Polyethyleneglycoldodecyl Ether $C_{20}H_{42}O_5$ 362.5488 [9002-92-0] | | | |
| Nihon Surfactant Kogyo K. K. | BL-25 POE(25) Lauryl Ether | 19.5 | BL-25 | 9002-92-0 |
| Nihon Surfactant Kogyo K. K. | BL-21 POE(21) Lauryl Ether | 19.0 | BL-21 | 9002-92-0 |
| ABCR GmbH & Co. | Brij 35 $C_{58}H_{118}O_{24}$ | — | AV15809 | 9002-92-0 |
| Acros Organics — International | BRIJ ® 30 $C_{20}H_{42}O_5$ | — | 216722 | 9002-92-0 |
| ICN Biomedical Research Products | Dodecylpoly(Ethylene Glycol Ether) | — | 151014 | 9002-92-0 |
| Spectrum Quality Products, Inc. | BRIJ ® 30 $C_{20}H_{42}O_5$ | — | BR100 | 9002-92-0 |
| | Brij 58 ($C_{56}H_{114}O_{21}$) 1123.504 [9004-95-9] | | | |
| Nihon Surfactant Kogyo K. K. | BC-40TX POE(40) Cetyl Ether | 20.0 | BC-40TX | 9004-95-9 |
| Nihon Surfactant Kogyo K. K. | BC-30TX POE(30) Cetyl Ether | 19.5 | BC-30TX | 9004-95-9 |
| Nihon Surfactant Kogyo K. K. | BC-25TX POE(25) Cetyl Ether | 18.5 | BC-25TX | 9004-95-9 |
| Nihon Surfactant Kogyo K. K. | BC-23 POE(23) Cetyl Ether | 18.0 | BC-23 | 9004-95-9 |
| Nihon Surfactant Kogyo K. K. | BC-20TX POE(20) Cetyl Ether | 17.0 | BC-20TX | 9004-95-9 |
| Nihon Surfactant Kogyo K. K. | BC-15TX POE(15) Cetyl Ether | 15.5 | BC-15TX | 9004-95-9 |
| Nihon Surfactant Kogyo K. K. | BC-10TX POE(10) Cetyl Ether | 13.5 | BC-10TX | 9004-95-9 |
| Nihon Surfactant Kogyo K. K. | BC-7 POE(7) Cetyl Ether | 11.5 | BC-7 | 9004-95-9 |
| Nihon Surfactant Kogyo K. K. | BC-5.5 POE(5.5) Cetyl Ether | 10.5 | BC-5.5 | 9004-95-9 |
| Nihon Surfactant Kogyo K. K. | BC-5.5 POE(2) Cetyl Ether | 8.0 | BC-5.5 | 9004-95-9 |
| | Brij 78 $C_{58}H_{118}O_{21}$ 1151.5576 [9005-00-9] | | | |
| Nihon Surfactant Kogyo K. K. | BS-20 POE(20) Stearyl Ether | 18.0 | BS-20 | 9005-00-9 |
| Nihon Surfactant Kogyo K. K. | BS-4 POE(4) Stearyl Ether | 9.0 | BS-4 | 9005-00-9 |
| Nihon Surfactant Kogyo K. K. | BS-2 POE(2) Stearyl Ether | 8.0 | BS-2 | 9005-00-9 |
| | Block Copolymer of Ethylene oxide and Propylene oxide [9003-11-6] | | | |
| Spectrum Quality Products, Inc. | Poloxamer 188 Surfactant | — | P1161 | 9003-11-6 |
| Spectrum Quality Products, Inc. | Poloxamer 181 Surfactant | — | P1162 | 9003-11-6 |
| Spectrum Quality Products, Inc. | Poloxamer 184 Surfactant | — | P1163 | 9003-11-6 |
| ICN Biomedical Research Products | PLURONIC F-68 ® POLYOL | — | 2750016 | 9003-11-6 |

TABLE 1-continued

| CHEMICAL SUPPLIER | PRODUCT AND CHEMICAL NAME | HLB | PRODUCT CODE | CAS NO. |
|---|---|---|---|---|
| | Tween(R) 20 [9005-64-5] | | | |
| Nihon Surfactant Kogyo K. K. | TL-10 POE(20) Sorbitan Monolaurate | 16.9 | TL-10 | 9005-64-5 |
| Nihon Surfactant Kogyo K. K. | GL-1 POE(6) Sorbitol Monolaurate | 15.5 | GL-1 | 9005-64-5 |
| | Tween(R) 40 [9005-66-7] | | | |
| Nihon Surfactant Kogyo K. K. | TP-10 POE(20) sorbitan Monopalmitate | 15.6 | TP-10 | 9005-66-7 |
| | Tween(R) 60 [9005-67-8] | | | |
| Nihon Surfactant Kogyo K. K. | TS-10 POE(20) Sorbitan Monostearate | 14.9 | TS-10 | 9005-67-8 |
| Nihon Surfactant Kogyo K. K. | TS-106 POE(6) Sorbitan Monostearate | 9.6 | TS-106 | 9005-67-8 |
| | Tween(R) 80 [9005-65-6] | | | |
| Nihon Surfactant Kogyo K. K. | TO-10M POE(20) Sorbitan Monooleate | 15.0 | TO-10M | 9005-65-6 |
| Nihon Surfactant Kogyo K. K. | TO-10 POE(20) Sorbitan Monooleate | 15.0 | TO-10 | 9005-65-6 |
| Nihon Surfactant Kogyo K. K. | TO-106 POE(6) Sorbitan Monooleate | 10.0 | TO-106 | 9005-65-6 |
| | Tergitol NP-33 [9016-45-9] | | | |
| Nihon Surfactant Kogyo K. K. | NP-20 POE(20) Nonyl Phenyl Ether | 20.0 | NP-20 | 9016-45-9 |
| Nihon Surfactant Kogyo K. K. | NP-18TX POE(18) Nonyl Phenyl Ether | 19.0 | NP-18TX | 9016-45-9 |
| Nihon Surfactant Kogyo K. K. | NP-15 POE(15) Nonyl Phenyl Ether | 18.0 | NP-15 | 9016-45-9 |
| | POE(1)POP(4) Cetyl Ether [9087-53-0] | | | |
| Nihon Surfactant Kogyo K. K. | PBC-34 POE(20)POP(4) Cetyl Ether | 16.5 | PBC-34 | 9087-53-0 |
| Nihon Surfactant Kogyo K. K. | PBC-44 POE(20)POP(8) Cetyl Ether | 12.5 | PBC-44 | 9087-53-0 |
| Nihon Surfactant Kogyo K. K. | PBC-33 POE(10)POP(4) Cetyl Ether | 10.5 | PBC-33 | 9087-53-0 |
| Nihon Surfactant Kogyo K. K. | PBC-31 POE(1)POP(4) Cetyl Ether | 9.5 | PBC-31 | 9087-53-0 |
| Nihon Surfactant Kogyo K. K. | PBC-41 POE(1)POP(8) Cetyl Ether | 9.5 | PBC-41 | 9087-53-0 |

Blending may be necessary, and desirable, if one of the emulsifiers, e.g., sodium lauryl sulfate, has an HLB outside the range of 1.5–20. Sodium lauryl sulfate, HLB value of about 40, will be blended with a low HLB value material, as illustrated above, for use.

Two methods are convenient for measuring long term stability: one is to determine final pH and final silane content, after aging, and the other is to performance test the silane emulsions on mortar cubes using standard test methods, such as those described in the above-mentioned DePasquale and Wilson patents. In the former, using an unsuitable buffering compound will not prevent the pH from swinging into a range promoting hydrolysis, e.g., from between about 7.5 and 4.0 and the final silane concentration will be materially reduced, e.g., cut from between about 40 and 20 percent and, in extreme cases, all the way down to zero percent. Such a test is usually carried out over a significant time period, e.g., after aging the emulsion under test for up to 12 months at room temperature.

In the performance test, 2-inch mortar cubes are immersed in an aqueous silane composition for about seconds. After the coating curing for about six days in an ambient environment, the immersed & cured cubes are immersed in water for 24 hours. The percent reduction in weight gain of compound treated cubes compared to untreated control cubes is indicative of the retention of silane content.

In experiments reported by Wilson '654, emulsions were unbuffered and prepared in accordance with prior art procedures. They contained biocide that decomposed to acetic acid and lowered the pH to 4. Within a month of manufacture, such emulsions showed decreased performance in the water repellency test set forth above. They also showed reduced silane concentration, as determined by gas chromatography. After 5 months, Wilson reported that the state of the art emulsion performed very poorly in water repellency tests on concrete.

In response to these observations, Wilson made numerous experiments that demonstrated that various buffers were effective in raising the pH of the state of the art emulsion to about 7.5, and maintaining the effectiveness of the formulation over a period of time.

Specifically, Wilson reported emulsions of predominantly n-octyltriethoxysilane, PCR, Inc.'s PROSIL® 9202 organofunctional silane, buffered in this manner, were analyzed by gas chromatography after one year, over 95 percent of the silane remained unhydrolyzed. Moreover, unbuffered emulsions at pH 4 showed less than 5% unhydrolyzed silane after a similar period, indicating the long term stabilizing effect of the buffering compound. Thus, it is surprising that the present invention does not require a buffering agent to perform satisfactorily.

If a biocidal agent is used, any of those well known in the art for imparting antimicrobial and biocidal activity can be used in conventional amounts, e.g., between about 0.1 and 0.5 percent by weight based on the composition. Suitable biocidal agents for these embodiments comprise dimethoxane (also known as acetomethoxane; acetic acid 2,6-dimethyl-m-dioxan-4-yl ester; acetic acid, ester with 2,6-dimethyl-m-dioxan-4-ol; DDOA; Giv-Gard DXN biocide; 6-Acetoxy-2,4-dimethyl-m-dioxane; 2,6-Dimethyl-1,3-dioxan-4-ol acetate; 2,6-Dimethyl-m-dioxan-4-ol acetate; 2,6-dimethyl-m-dioxan-4-yl acetate; and 6-acetoxy-2,4-dimethyl-1,3-dioxane), sold by Givaudan Corp. under the trademark Giv-Gard DXN biocide, methyl p-methoxy benzoate (also known as methyl anisate and methyl para-anisate) sold by INDOFINE Chemical Company, Inc., and the like. Typical concentrations of these biocides are 0.15 percent by weight.

In addition to biocides, the present invention may include other additives such as fragrances, colorants, thickeners, foaming agents, anti-foaming agents, and the like.

The present invention may be understood after a review of the following that shows the combination of effective amounts of a hydrolyzable silane, a low molecular weight silicone and water to make aqueous silane compositions. The process was carried out on a laboratory and a pilot plant scale.

TABLE 2

Materials For Making Aqueous Silane Compositions

| INGREDIENT | CHEMICAL NAME OF INGREDIENT | SOURCES | SYNONYMS FOR CHEMICAL NAME OF INGREDIENT |
|---|---|---|---|
| Hydrolyzable Silane | Triethoxyoctylsilane ($C_{14}H_{32}O_3Si$) | Degussa-Hül AG (Sivento ® Silanes); Acros Organics; Gelest Inc.; Silar Laboratories; Pfaltz & Bauer, Inc.; TCI America; Lancaster Synthesis Inc. | 1-(triethoxysilyl)-octan; DYNASYLAN OCTEO; n Octyltriethoxysilane; N-Octyltriethoxysilane, 97%; Octyltriethoxysilane; Triethoxy-n-octylsilane; Triethoxyoctylsilane; Triethoxy-octylsilane |
| Low Molecular Weight Silicone | poly(propyl-, ethoxy) silicone | Degussa-Hül AG (Sivento ® Silanes) Gelest Inc.; Silar Laboratories | VPS 9892 silicone; poly(n-propyltriethoxysilane); poly(propyltriethoxysilane); poly(triethoxy-n-propylsilane; poly(propyl-, ethoxy) silicone |
| Amino-Functional Silicone | Reactive amino-modified silicone fluid | Advance Polymer, Inc.; Acros Organics; Gelest Inc.; Silar Laboratories | APS-327; Co-modified reactive silicone fluid containing amino and alkoxy groups; reactive amine/alkoxy functional silicone fluid containing primary and secondary amine functionality |
| Amino-Functional Silane | N-(2-Aminoethyl)-3-Amino propylmethyldimethoxysilane | Advance Polymer, Inc.; Gelest Inc.; Silar Laboratories; Degussa-Hül AG (Sivento ® Silanes); TCI Americas; Alfa Aesar | (aminoethylaminopropyl)methyldimethoxysilane; n-(2-aminoethyl)-3-aminopropylmethyldimethoxy silane; n-(2-aminoethyl)-3-aminopropylmethyldimethoxysilane (gamma-); (aminoethylaminopropyl)methyldimethoxysilane; 3-(2-aminoethylamino)propyl-methyl-dimethoxysilane; 3-(2-aminoethylamino)propyl-methyldimethoxysilane; DYNASYLAN 1411; methyldimethoxy-n-(2-aminoethyl)-3-aminopropylsilane; n-(2-aminoethyl)-3-aminopropylmethyldimethoxysilane; n-[3-(dimethoxymethylsilyl)propyl]ethylenediamine; n-2-aminoethyl-3-aminopropylmethyldimethoxysilane, AP-SILANE 31 |
| Non ionic Emulsifier | octylphenoxypolyethoxyethanol | Spectrum Quality Products, Inc. | IGEPAL CA-630; Alkylaryl polyether alcohol; Octyl phenol ethoxylate; Triton X-100 Surfactant; Polyoxyethylated octyl phenol; alpha-[4-(1,1,3,3-tetramethylbutyl)phenyl]-omega-hydroxypoly(oxy-1,2-ethanediyl); Octoxinol; Triton X 100; Triton X 102; Ethylene glycol octyl phenyl ether; Polyoxyethylene octyl phenyl ether; p-(1,1,3,3-Tetramethylbutyl)phenol ethoxylate; Octylphenoxypolyethoxyethanol; Polyethylene glycol mono [4-(1,1,3,3-tetramethylbutyl)phenyl] ether; Poly(oxyethylene)-p-tert-octylphenyl ether; POE octylphenol; polyoxyethylene (10) octylphenol; POE (10) octylphenol; POE(10) Octyl Phenyl Ether; Octoxynol-10; POE(3) Octyl Phenyl Ether; Octoxynol-3; POE(30) Octyl Phenyl Ether; Octoxynol-30 |
| Non ionic Emulsifier | $C_{11-15}H_{23-31}O(CH_2CCH_2O)xH$ | Spectrum Quality Products, Inc. | TERGITOL 15-S-5; $C_{11-15}$-sec-alkyl-omega-hydroxypoly(oxy-1,2-ethanediyl); $C_{11-15}$-secondary alcohols, ethoxylated; SM-5; Ethoxylated Secondary Alcohols |
| Non ionic Emulsifier | Nonylphenoxy poly(ethyleneoxy)ethanol | Spectrum Quality Products, Inc. | NP-30, Polyethylene Mono(nonylphenyl)ether Glycols; Polyoxyethylene (9) Nonylphenyl Ether; nonyl phenol ethoxylate; nonylphenyl polyethyleneglycol ether, nonionic; polyethylene glycol 450 nonyl phenyl ether, nonionic surfactant; |
| Non ionic Emulsifier | Nonylphenoxy poly(ethyleneoxy)ethanol | Spectrum Quality Products, Inc. | Tergitol TP-9; polyethylene glycol 450 nonyl phenyl ether; Ethoxylated nonylphenol; antarox; antarox bl-344; alpha(nonylphenyl)-omega-hydroxypoly(oxy-1,2-ethanediyl); polyethylene glycols mono(nonylphenyl)ether; macrogol nonylphenyl ether; nonoxinol; polyoxyethylene(n)-nonylphenyl ether; nonylphenoxypolyethoxyethanol; nonylphenyl polyethylene glycol ether; nonoxynol; conco ni; dowfax 9n; igepal co; Makon; neutronyx 600's; nonipol no; polytergent b; renex 600's; solar np; triton n; tergitol np; T-DET-N; surfionic n; sterox; arkopal N-090; carsonon N-9; conco ni-90; igepal co-630; neutronyx 600; PEG-9 nonyl phenyl ether; protachem 630; rewpol hv-9; tergitol tp-9 (non-ionic); polyoxyethylene (1.5) nonyl phenol; polyoxyethylene (4) nonylphenol; polyoxyethylene (5) nonylphenol; polyoxyethylene (6) nonylphenol; polyoxyethylene (8) nonylphenol; polyoxyethylene (10) nonylphenol; |

TABLE 2-continued

Materials For Making Aqueous Silane Compositions

| INGREDIENT | CHEMICAL NAME OF INGREDIENT | SOURCES | SYNONYMS FOR CHEMICAL NAME OF INGREDIENT |
|---|---|---|---|
| Non ionic Emulsifier | Nonylphenoxy poly(ethyleneoxy)ethanol | Spectrum Quality Products, Inc. | polyoxyethylene (14) nonylphenol; polyoxyethylene (20) nonylphenol; polyoxyethylene (30) nonylphenol; Glycols, polyethylene, mono(nonylphenyl) ether; Nonylphenol polyethylene glycol ether; Nonylphenol, polyoxyethylene ether; Nonylphenoxypoly(ethyleneoxy)ethanol; POE nonylphenol; Polyoxyethylene nonylphenol; Tergitol NP-14; Tergitol NP-27; Tergitol NP-35; Tergitol NP-40; Tergitol npx; POE (1.5) nonyl phenol; POE (4) nonylphenol; POE (5) nonylphenol; POE (6) nonylphenol; POE (8) nonylphenol; POE (10) nonylphenol; POE (14) nonylphenol; POE (20) nonylphenol; POE (30) nonylphenol; POE(15) Nonyl Phenyl Ether; Nonoxynol-15; POE(18) Nonyl Phenyl Ether; Nonoxynol-18; POE(20) Nonyl Phenyl Ether; Nonoxynol-20; |
| Biocide | Methyl-3,5,7-triaza-1-azoniaadamantane chloride | Blackman Lab. Inc | BL-3056; Busan 1024; Methyl-3,5,7-triaza-1-azoniatricyclo[3.3.1.1(3,7)]decane, chloride; Methylhexamethylenetetramine chloride; 3,5,7-Triaza-1-azoniatricyclo[3.3.1.1(3,7)]decane, 1-methyl-, chloride; |
| Biocide | Aqueous Solution of Substituted Hydantoin [(1,3-dimethylo)1-5,5-dimethyl hydantoin; 1-(Hydroxymethyl)-5,5-dimethyl Hydantoin] | Calgon Corp. | Boichek 24; 1,3-bis(hydroxymethyl)-5,5-dimethyl-2,4-imidazolidinedione; 1,3-dimethylol-5,5-dimethyl hydantoin; Dantoin dmdmh; Dimethyloldimethyl hydantoin; DMDMH; Glydant; Glydant Plus (95:5 mixture of DMDM hydantoin and Iodo propynyl butyl carbamate); Mackgard DM; Nipaguard DMDMH; Bis(hydroxymethyl)-5,5-dimethyl-2,4-imidazolidinedione; Bis(hydroxymethyl)-5,5-dimethylhydantoin; Dantion DMDMH 55; Dantoguard; Dimethylol-5,5-dimethylhydantoin; Hydantoin, 1,3-bis(hydroxymethyl)-5,5-dimethyl-; Imidazolidinedione, 1,3-bis(hydroxymethyl)-5,5-dimethyl-;/ Imidazolidinedione, 1-(hydroxymethyl)-5,5-dimethyl-; MDM hydantoin; Monomethylol-5,5-dimethylhydantoin; 1-(Hydroxymethyl)-5,5-dimethylimidazolidine-2,4-dione;/ |
| Other | Hexanoic acid, 2-ethyl-, zinc salt | OMG Americas, Inc Pfaltz & Bauer, Inc. Alfa Aesar ICN Biomedical Research Products | 18% Zinc HEX CEM; Ethylhexanoic acid zinc salt; Hexanoic acid, 2-ethyl-, zinc salt; ZINC 2-ETHYLHEXANOATE; Zinc 2-ethylhexanoate; Zinc octoate; Zinc Octoate (in Mineral Spirits); 18% Zinc Content; 1% ethylene glycol monomethylether, 99% (Assay) (Zn y22%) |

Table 2 above contains a listing of ingredients, their chemical names, sources, and synonyms (e.g., alternative trade names and chemical nomenclature). Some or all of these ingredients were used to prepare a number of compositions that were examined for their effectiveness by measuring, among other things, their stability after dilution and centrifuging, depth of penetration, and percent reduction in water absorption. Although some specific examples of hydrolyzable silane, low molecular weight silicone, amino-functional silane and amino-functional silicones have been give in Table 2 and used in the examples, and other such ingredients that have appropriate structures that accomplish the functions of the present invention are contemplated as being within the scope of the present invention. To that end, Applicant directs the reader's attention to the composition disclosed in, for example in the various publications of Gelest, Inc. of Tullytown, Pa. entitled "Silicon Esters" by Barry Arkles; "Functional Silicone Reactivity Guide;" "Silicone Fluids: Stable Inert Media" and "Silicone Coatings, Encapsulants, Gels" available at the time of the filing of the present application at the News, Technology& Library section of the Gelest Inc. internet site; and the publication of Degussa-Hüls AG entitled "Silanes." The subject matter of each of these publications is herein incorporation by reference in their entirety.

Prior to combining effective amounts of a hydrolyzable silane, a low molecular weight silicone and water to make the compositions according to the present invention, a pH-adjusting additive and a stabilizing additive were prepared.

The pH-adjusting additive was made by combining about 82 parts octylphenoxypolyethoxyethanol (IGEPAL CA-630 obtainable from ICN Biomedical Research Products), about 17 parts N-2-aminoethyl-3-aminopropyl methyldimethoxysilane (AP-SILANE 31 silane coupling agents obtained from Advanced Polymer, Inc.) and about 1 part [hexanoic acid, 2-ethyl-, zinc salt in about ~80% in mineral spirits (18% Zinc HEX CEM obtained from OMG Americas, Inc.)]. These materials were than heated to about 180° F. and held there for about half an hour. The pH-adjusting additive was put aside for later use.

The stabilizing additive was made by combining about 24 parts octylphenoxypolyethoxyethanol (IGEPAL CA-630 obtainable from ICN Biomedical Research Products), about 58 parts $C_{11-15}H_{23-31}O(CH_2CCH_{2O})xH$ (NP-30 obtainable from Pfaltz & Bauer, Inc.), about 17 parts triethoxyoctylsilane (Prosil 9202 obtainable from Lancaster Synthesis Inc. successor of PCR, Inc.), and about 0.1 parts [hexanoic acid, 2-ethyl-, zinc salt in about ~80% in mineral spirits (18% Zinc HEX CEM obtained from OMG Americas, Inc.)]. These materials were than heated to about 260° F. and held there for about two hours. The stabilizing additive also was put aside for later use.

To make the compositions according to the present invention ingredients were combined in appropriate amounts to make about 70 wt % {Silicone(s) and Silane(s)} in water formulations. In the discussion that follows, when the amount of an ingredient is given in parts it is with reference to parts of the about 70 wt % {Silicone(s) and Silane(s)} in water formulations composition.

At the start of making each of Compositions 1–8 containing a hydrolyzable silane and a low molecular weight silicone [e.g., poly(propyl-, ethoxy) silicone] in water and triethoxyoctylsilane in water) as discussed in Tables 3, 4, and 5, about 26.2 parts deionized water were added to a first kettle having a paddle mixer. While rapidly mixing, about 1.2 parts nonylphenoxypoly(ethyleneoxy)ethanol (Tergitol 15-S-5 obtainable from Spectrum Quality Products, Inc); about 1.9 parts $C_{11-15}H_{23-31}O(CH_2CCH_2O)xH$ (NP-30 obtainable from Pfaltz & Bauer, Inc.); and about 0.7 parts of the stabilizing additive (formulation described above) were added to the deionized water and mixed well.

Simultaneously, a portion of the octyltriethoxy silane (Prosil 9202 obtainable from Lancaster Synthesis Inc. successor of PCR, Inc.) and about 0.5 part reactive amino-modified silicone fluid (APS-327 reactive amine/alkoxy functional silicone fluid containing primary and secondary functionality obtained from Advanced Polymer, Inc) were added to a second kettle having a paddle mixer to make a premixed silane-(amino function silicone) mixture. This premixed silane-(amino function silicone) mixture was then added to the first kettle.

Then, the balance of the octyltriethoxy silane was added to the first kettle. The poly(propyl-, ethoxy) silicone (VPS 9892 polysiloxane, containing propyl- and ethoxy groups obtained from Degussa-Hül AG a.k.a Sivento® Silanes Inc.) was added to the first kettle after the balance of octyltriethoxy silane. Table 3 contains a summary of the weight percent octyltriethoxy silane (i.e., hydrolyzable silane) and poly(propyl-, ethoxy) silicone (i.e.,low molecular weight silicone) for Compositions 1–8.

If desired, at this point about 0.2 parts of a commercially available aqueous solution of substituted hydantoin (Boichek 24 obtained from Calgon Corp) and about 0.2 parts of commercially available methyl-3,5,7-triaza-1-azoniaadamantane chloride (Busan 1024 obtained from Blackman Lab. Inc) were added to the first kettle. All the ingredients were then mixed well to create a substantially homogeneous formulation.

The pH of the substantially homogeneous formulation was measured and, to the extent necessary, the pH was adjusted by the addition of the earlier prepared pH-adjusting additive. After the pH was adjusted to between about 6.5 and 7.5, the formulation was then directed from the first kettle to a homogenizer for a two-step homogenization process. First, the pH-adjusted, substantially homogeneous formulation was pumped to a high pressure (about 3,000 pounds per square inch [psi]). In the first homogenization stage the pressure dropped from the high pressure to an intermediate pressure (an about 2,000 psi pressure drop). In the second stage pressure dropped from the intermediate pressure to about atmospheric pressure (an about 1,000 psi pressure drop).

The result was aqueous composition solutions containing about 70 wt % {Silicone(s) and Silane(s)}. The compositions may be diluted to reduce the amount of {Silicone(s) and Silane(s)}. Tables 3, 4, and 5 demonstrate that the compositions diluted to about 2 wt % {Silicone(s) and Silane(s)}, about 20 wt % {Silicone(s) and Silane(s)} and 40 wt % {Silicone(s) and Silane(s)}.

TABLE 3

Aqueous Silane Compositions

Aqueous Silane Composition

Weight Percent

| Composition No. | Hydrolyzable Silane* | Low Molecular Weight Silicone§ | Stability After dilution to 2% and Centrifuging at 2500 RPM for 10 Minutes |
| --- | --- | --- | --- |
| Composition 1(100/0) | 100 | 0 | 75 |
| Composition 2(55/15) | 79 | 21 | 84 |
| Composition 3(50/20) | 71 | 29 | 90 |
| Composition 4(45/25) | 64 | 36 | 93 |
| Composition 5(40/30) | 57 | 42 | 93 |
| Composition 6(35/35) | 50 | 50 | 95 |
| Composition 7(20/50) | 29 | 71 | 91 |
| Composition 8(0/100) | 0 | 100 | 92 |

*Triethoxyoctylsilane;
§poly(propyl-, ethoxy) silicone

TABLE 4

Comparison of Aqueous Silane Compositions & Silane Composition in Isopropyl alcohol (IPA)

| | Weight Percent | | Depth Of Penetration (centimeters) | |
|---|---|---|---|---|
| Composition No. | Hydrolyzable Silane* | Low Molecular Weight Silicone§ | Diluted to a 40 wt % composition | Diluted to a 20 wt % composition |
| Aqueous Silane Composition | | | | |
| Composition 1(100/0) | 100 | 0 | 0.4 | 0.2 |
| Composition 2(55/15) | 79 | 21 | 0.4 | 0.2 |
| Composition 3(50/20) | 71 | 29 | 0.5 | 0.2 |
| Composition 4(45/25) | 64 | 36 | 0.4 | 0.2 |
| Composition 5(40/30) | 57 | 43 | 0.5 | 0.2 |
| Composition 6(35/35) | 50 | 50 | 0.6 | 0.2 |
| Composition 7(20/50) | 29 | 71 | 0.5 | 0.2 |
| Composition 8(0/100) | 0 | 100 | 0.4 | 0.3 |
| Silane Composition in Isopropyl alcohol (IPA) | | | | |
| Composition 9 | 100 | 0 | 0.3 | — |
| Composition 10 | 0 | 100 | 0.3 | — |
| Composition 11 | 40 | 0 | 0.2 | — |
| Composition 12 | 0 | 40 | 0.2 | — |

TABLE 5

Comparison of Aqueous Silane Compositions & Silane Composition in Isopropyl alcohol (IPA)

| | Weight Percent | | Percent Reduction in Water Absorbed | |
|---|---|---|---|---|
| Composition No. | Hydrolyzable Silane* | Low Molecular Weight Silicone§ | Diluted to a 40 wt % composition | Diluted to a 20 wt % composition |
| Aqueous Silane Composition | | | | |
| Composition 1(100/0) | 100 | 0 | 93 | 92 |
| Composition 2(55/15) | 79 | 21 | 90 | 92 |
| Composition 3(50/20) | 71 | 29 | 92 | 92 |
| Composition 4(45/25) | 64 | 36 | 92 | 93 |
| Composition 6(40/30) | 57 | 43 | 89 | 92 |
| Composition 5(35/35) | 50 | 50 | 93 | 91 |
| Composition 7(20/50) | 29 | 71 | 93 | 90 |
| Composition 8(0/100) | 0 | 100 | 92 | 92 |
| Silane Composition in Isopropyl alcohol (IPA) | | | | |
| Composition 9 | 100 | 0 | 93 | — |
| Composition 10 | 0 | 100 | 93 | — |
| Composition 11 | 40 | 0 | 93 | — |
| Composition 12 | 0 | 40 | 92 | — |

Tables 3, 4, and 5 contain summaries for compositions 1–12. Compositions 1–8 were made so that a sum of the silane(s) and silicone(s) was substantially 70 weight percent and water was the balance. The 70 weight percent compositions were then diluted to (1) the sum of the silane(s) and silicone(s) being substantially about 40 weight percent with water as the balance; (2) the sum of the silane(s) and silicone(s) being substantially about 20 weight percent with water as the balance; and (3) the sum of the silane(s) and silicone(s) being substantially about 2 weight percent with water as the balance. It will be appreciated by those skilled in the art that a sum of the silane(s) and silicone(s) may range from comprising greater than about zero weight percent and 90 or more weight percent with water being the balance.

Compositions 9 and of the Tables 3, 4, and 5 were substantially about 100 weight percent hydrolyzable silane and substantially about 100 weight percent low molecular weight silicone, respectfully. Compositions 11 and 12 of Tables 3, 4, and 5 were substantially about 40 weight percent hydrolyzable silane with isopropyl alcohol being the balance and substantially about 40 weight percent low molecular weight silicone with isopropyl alcohol being the balance, respectively.

FIG. 1 is a graphical representation of data for stability after dilution to 2% and centrifuging at 2500 RPM for 10 minutes for aqueous silane compositions to an embodiment of the present invention. The tests for the data were conducted using a centrifuge model SBV, manufactured by International Equipment Co. and set-up to handle about 8 once jars containing about 100 milliliters of composition. To better visualize any separations during the ten minutes of centrifuging at 2500 round per minute (RPM), food coloring was added to the compositions. The amount or percentage of non-separation was recorded as a percentage. This represents the height of the non-separated portion as a percentage of the total height of the composition in the jar.

Figure 2:
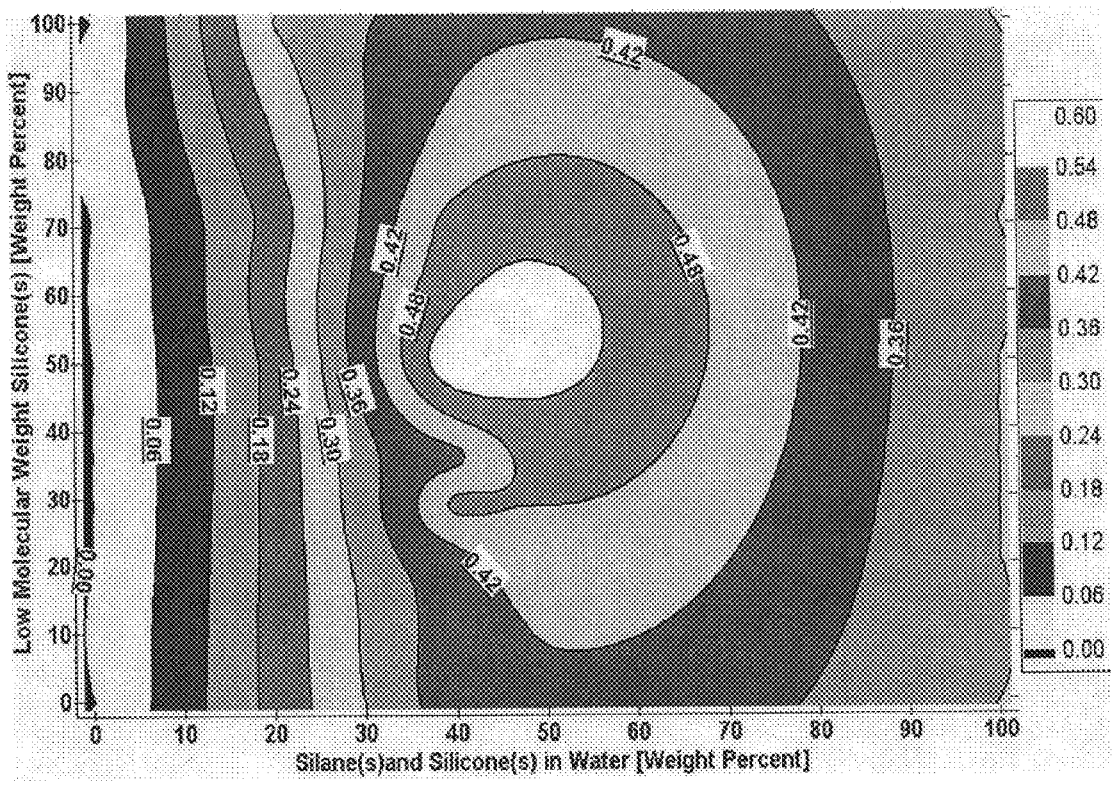
FIG. 2 is a graphical representation of the depth of penetration data of Table 4 in the form of a variogram represented by contours according to an embodiment of the present invention.

FIG. 2 is a graphical representation of the depth of penetration data of Table 4 in the form of a variogram represented by contours according to an embodiment of the present invention. The surface plot, or variogram, was generated using 3DField contouring surface plotting program available at any one of https://secure.reg.net/product.asp?ID=2631; http://field.hypermart.net/; and https://www.regsoft.net/regsoft/vieworderpage.php3?productid=31517. The 3 DField contour surface plotting program is authored by Vladimir Galouchko (e-mail: vdvgal@cityline.ru). The Block Kriging option was used to estimate the value of a block from a set of nearby sample values using kriging. Kriging is a weighted-moving-average interpolation method where the set of weights assigned to samples minimizes the estimation variance, which is computed as a function of the variogram model and locations of the samples relative to each other, and to the point or block being estimated.

Figure 3:
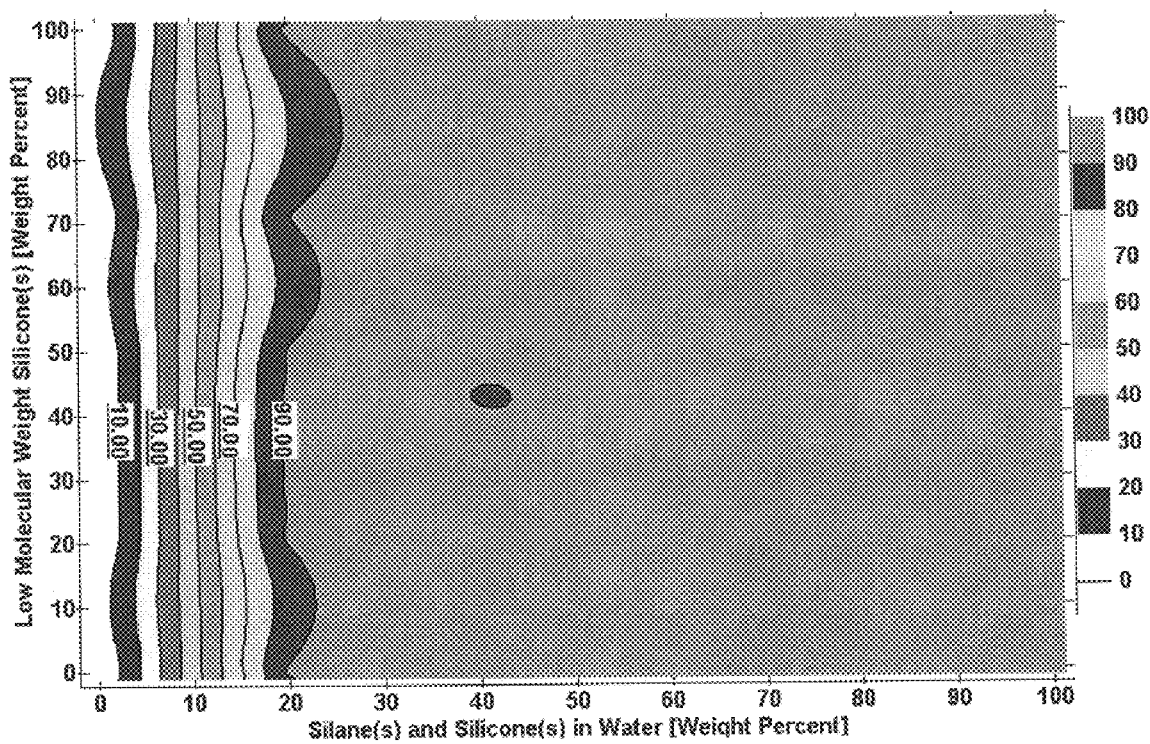
FIG. 3 is a graphical representation of the percent reduction in water absorbed data of Table 5 in the form of a variogram represented by contours according to an embodiment of the present invention.

FIG. 3 is a graphical representation of the percent reduction in water-absorbed data of Table 5 in the form of a variogram represented by contours according to an embodiment of the present invention. This data represents the reduction in weight gain of 2-inch mortar cubes treated by compositions of the present invention following submersion in water compared to the weight gain of 2-inch mortar cubes that has not been treated.

The graphical representations in FIGS. 1, 2 and 3 of the data in Tables 3, 4, and shows that the wt % {Silicone(s) and Silane(s)} may range between about 0 and 100. Likewise, the graphical representations in FIGS. 1, 2 and 3 of the data in Tables 3, 4, and 5 shows that the wt % low molecular weight silicone may range between about 0 and 100.

Certain modifications and improvements will occur to those skilled in the art upon a reading of the foregoing description. For example, while the examples showed the an aqueous composition made to about 70 wt % {Silicone(s) and Silane(s)} and the diluted by the addition of water to aqueous compositions of 2 wt % {Silicone(s) and Silane(s)}, 20 wt % {Silicone(s) and Silane(s)} and 40 wt % {Silicone(s) and Silane(s)}, aqueous compositions may be made directly to any range of wt % { Silicone(s) and Silane(s)} desired.

Also, an aqueous composition of the present invention may be considered a formulation of ingredients initially comprising any one of a hydrolyzable silane; a low molecular weight silicone; an amino-functional silicone; an amino-functional silane; and water. However, these ingredients may partially or completely react, dissociate and the like. Thus, Applicant has stated that an aqueous composition of the present invention initially comprises the ingredients.

It should be understood that all such modifications and improvements have been deleted herein for the sake of conciseness and readability but are properly within the scope of the following claims.

What is claimed:

1. An aqueous silane composition said composition initially comprising effective amounts of:
   (a) a hydrolyzable silane;
   (b) a low molecular weight silicone;
   (c) an amino-functional silane initially combined with a non-ionic emulsifier, wherein said amino-functional silane initially combined with said non-ionic emulsifier includes a reaction product of said amino-functional silane and said nonionic emulsifier; and
   (d) a balance of water.

2. The composition according to claim 1 wherein said non-ionic emulsifier includes reactive hydroxyl groups.

3. The composition according to claim 1 wherein said non-ionic emulsifier is an ethoxylated alkyl phenol.

4. The composition according to claim 1 wherein said amino-functional silane initially combined with said non-ionic emulsifier is about 0.5 weight percent of the composition.

5. The composition according to claim 1 further including an additional non-ionic emulsifier.

6. The composition according to claim 5 wherein said additional non-ionic emulsifier is between about 2 and 3 percent by weight of the composition.

7. The composition according to claim 1 wherein said hydrolyzable silane is an alkyl-silane.

8. The composition according to claim 7 wherein said hydrolyzable silane is an alkoxy-silane.

9. The composition according to claim 8 wherein said alkoxy-silane is octyl-triethoxy-silane.

10. The composition according to claim 8 wherein said alkoxy-silane is hexyl-trimethoxy-silane.

11. The composition according to claim 1 wherein a combination of said hydrolyzable silane and said low molecular weight silicone is between about 0 and 90 percent by weight of the composition.

12. The composition according to claim 11 wherein a combination of said hydrolyzable silane and said low molecular weight silicone is between about 30 and 90 percent by weight of the composition.

13. The composition according to claim 12 wherein a combination of said hydrolyzable silane and said low molecular weight silicone is between about 35 and 75 percent by weight of the composition.

14. The composition according to claim 1 wherein said low molecular weight silicone is between about 10 and 90 percent by weight of active components comprising said hydrolyzable silane, low molecular weight silicone and amino-functional silicone.

15. The composition according to claim 14 wherein said low molecular weight silicone is between about 20 and 80 percent by weight of active components comprising said hydrolyzable silane, low molecular weight silicone and amino-functional silicone.

16. The composition according to claim 15 wherein said low molecular weight silicone is between about 40 and 65 percent by weight of active components comprising said hydrolyzable silane, low molecular weight silicone and amino-functional silicone.

17. The composition according to claim 1 wherein said low molecular weight silicone is represented by the formula

where $R^1$ is any one of H, $-(CH_2)_w(CH_3)$ w=0,1,2, or 3, $-CH(CH_3)_2$, and
$-(CH_2)_xCH(CH_3)_2$ x=0,1,2, or 3;
$R^2$ is any one of $-O(CH_2)_yCH_3$ y=0,1,2, or 3 and
$-O(CH_2)_zCH(CH_3)_2$ z=0,1,2, or 3; and
n is a low value such that the composition is effective.

18. The composition according to claim 17 wherein said low value of n is 0, 1, 2, 3, or 4.

19. The composition according to claim 1 wherein said low molecular weight silicone is represented by the formula

where $R^1$ is any one of $-(CH_2)_y(CH_3)$ y=1, 2, or 3, $-CH(CH_3)_2$, and
$-(CH_2)_yCH(CH_3)_2$ y=1,2, or 3;
$R^2$ is any one of $-OCH_2CH_3$ and
$-O(CH_3)$; and
n is an effective value.

20. The composition according to claim 19 wherein said effective value of n is 0, 1, 2, 3, or 4.

21. The composition according to claim 1 wherein said low molecular weight silicone is represented by the following

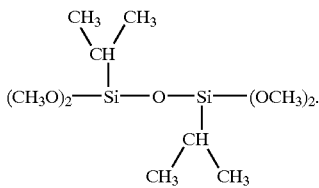

22. The composition according to claim 1 wherein said low molecular weight silicone is represented by the following

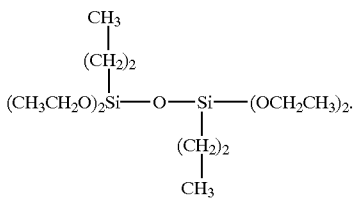

23. The composition according to claim 1 wherein the amine value of said amino-functional siloxane is between about 50 and 100 mg KOH/gm.

24. The composition according to claim 23 wherein the amine value of said amino-functional siloxane is about 70 mg KOH/gm.

25. The composition according to claim 1 wherein said amino-functional siloxane is about 0.5 percent by weight of the composition.

26. An aqueous silane composition said composition initially comprising effective amounts of:
   (a) a hydrolyzable silane;
   (b) a low molecular weight silicone;
   (c) an amino-functional silicone;
   (d) an amino-functional silane initially combined with a non-ionic emulsifier, wherein said amino-functional silane initially combined with said non-ionic emulsifier includes a reaction product of said amino-functional silane and said nonionic emulsifier; and
   (e) the balance of water.

27. The composition according to claim 26 wherein said amino-functional silane initially combined with said non-ionic emulsifier is a reaction product of said amino-functional silane and said non-ionic emulsifier.

28. The composition according to claim 26 wherein said non-ionic emulsifier includes reactive hydroxyl groups.

29. The composition according to claim 26 wherein said non-ionic emulsifier is an ethoxylated alkyl phenol.

30. The composition according to claim 26 wherein said amino-functional silane initially combined with said non-ionic emulsifier is about 0.5 weight percent of the composition.

31. The composition according to claim 26 further including an additional non-ionic emulsifier.

32. The composition according to claim 31 wherein said additional non-ionic emulsifier is between about 2 and 3 percent by weight of the composition.

33. The composition according to claim 26 wherein said hydrolyzable silane is an alkyl-silane.

34. The composition according to claim 33 wherein said hydrolyzable silane is an alkoxy-silane.

35. The composition according to claim 34 wherein said alkoxy-silane is octyl-triethoxy-silane.

36. The composition according to claim 34 wherein said alkoxy-silane is hexyl-trimethoxy-silane.

37. The composition according to claim 26 wherein a combination of said hydrolyzable silane and said low molecular weight silicone is between about 0 and 90 percent by weight of the composition.

38. The composition according to claim 37 wherein a combination of said hydrolyzable silane and said low molecular weight silicone is between about 30 and 90 percent by weight of the composition.

39. The composition according to claim 38 wherein a combination of said hydrolyzable silane and said low molecular weight silicone is between about 35 and 75 percent by weight of the composition.

40. The composition according to claim 26 wherein said low molecular weight silicone is between about 10 and 90 percent by weight of active components comprising said a hydrolyzable silane, a low molecular weight silicone, an amino-functional silicone, and an amino-functional silane.

41. The composition according to claim 40 wherein said low molecular weight silicone is between about 20 and 80 percent by weight of active components comprising said a hydrolyzable silane, a low molecular weight silicone, an amino-functional silicone, and an amino-functional silane.

42. The composition according to claim 41 wherein said low molecular weight silicone is between about 40 and 65 percent by weight of active components comprising said a hydrolyzable silane, a low molecular weight silicone, an amino-functional silicone, and an amino-functional silane.

43. The composition according to claim 26 wherein said low molecular weight silicone is represented by the formula

where $R^1$ is any one of H, —$(CH_2)_w(CH_3)$ w=0,1,2, or 3, —$CH(CH_3)_2$, and
—$(CH_2)_xCH(CH_3)_2$ x=0,1,2, or 3;

R is any one of —$O(CH_2)_yCH_3$ y=0,1,2, or 3 and —$O(CH_2)_zCH(CH_3)_2$ z=0,1,2, or 3; and n is a low value such that the composition is effective.

44. The composition according to claim 43 wherein said low value of n is 0, 1, 2, 3, or 4.

45. The composition according to claim 26 wherein said low molecular weight silicone is represented by the formula

where $R^1$ is any one of —$(CH_2)_y(CH_3)$ y=1, 2, or 3, —$CH(CH_3)_2$, and
$(CH_2)_yCH(CH_3)_2$ y=1,2, or 3;

R is any one of —$OCH_2CH_3$ and
—$O(CH_3)$; and n is an effective value.

46. The composition according to claim 45 wherein said effective value of n is 0, 1, 2, 3, or 4.

47. The composition according to claim 26 wherein said low molecular weight silicone is represented by the following

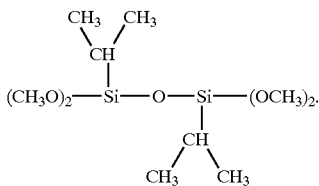

48. The composition according to claims wherein said low molecular weight silicone is represented by the following

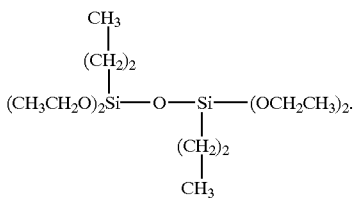

49. The composition according to claim 26 wherein the amine value of said amino-functional siloxane is between about 50 and 100 mg KOH/gm.

50. The composition according to claim 49 wherein the amine value of said amino-functional siloxane is about 70 mg KOH/gm.

51. The composition according to claim 26 wherein said amino-functional siloxane is about 0.5 percent by weight of the composition.

52. A method for making an aqueous silane composition comprising combining effective amounts of:
    (a) a hydrolyzable silane;
    (b) a low molecular weight silicone; and
    (c) an amino-functional silane combined with a non-ionic emulsifier, wherein said amino-functional silane initially combined with said non-ionic emulsifier includes a reaction product of said amino-functional silane and said nonionic emulsifier;and
    (d) a balance of water.

53. A method for making an aqueous silane composition comprising combining effective amounts of:
    (a) a hydrolyzable silane;
    (b) a low molecular weight silicone represented by one of

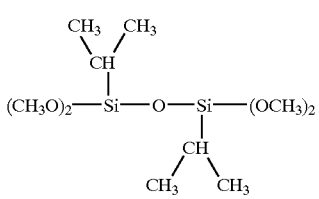

and

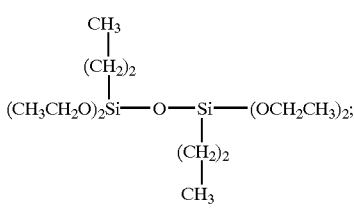

(c) an amino-functional silicone; and
    (d) the balance of water.

54. A method for making an aqueous silane composition composition comprising combining effective amounts of:
    (a) a hydrolyzable silane;
    (b) a low molecular weight silicone;
    (c) an amino-functional silicone;
    (d) an amino-functional silane combined with a non-ionic emulsifier, wherein said amino-functional silane initially combined with said non-ionic emulsifier includes a reaction product of said amino-functional silane and said nonionic emulsifier; and
    (e) the balance of water.

55. An aqueous silane composition said composition initially comprising effective amounts of:
    (a) a hydrolyzable silane;
    (b) a low molecular weight silicone represented by one of

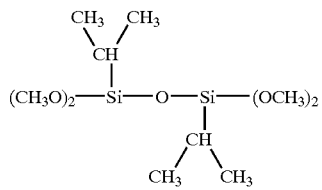

and

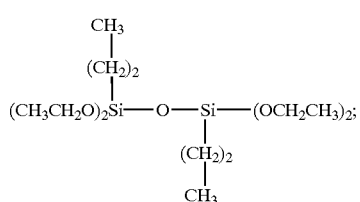

(c) an amino-functional silicone; and
    (d) the balance of water.

56. The composition according to claim 52 wherein said hydrolyzable silane is an alkyl-silane.

57. The composition according to claim 56 wherein said hydrolyzable silane is an alkoxy-silane.

58. The composition according to claim 57 wherein said alkoxy-silane is octyl-triethoxy-silane.

59. The composition according to claim 57 wherein said alkoxy-silane is hexyl-trimethoxy-silane.

60. The composition according to claim 55 wherein a combination of said hydrolyzable silane and said low molecular weight silicone is between about 0 and 90 percent by weight of the composition.

61. The composition according to claim 60 wherein a combination of said hydrolyzable silane and said low molecular weight silicone is between about 30 and 90 percent by weight of the composition.

62. The composition according to claim 61 wherein a combination of said hydrolyzable silane and said low molecular weight silicone is between about 35 and 75 percent by weight of the composition.

63. The composition according to claim 55 wherein said low molecular weight silicone is between about 10 and 90 percent by weight of active components comprising said hydrolyzable silane, low molecular weight silicone and amino-functional silicone.

64. The composition according to claim 63 wherein said low molecular weight silicone is between about 20 and 80 percent by weight of active components comprising said hydrolyzable silane, low molecular weight silicone and amino-functional silicone.

65. The composition according to claim 64 wherein said low molecular weight silicone is between about 40 and 65 percent by weight of active components comprising said hydrolyzable silane, low molecular weight silicone and amino-functional silicone.

66. The composition according to claim 55 wherein an amine value of the amino-functional siloxane is between about 50 and 100 mg KOH/gm.

67. The composition according to claim 65 wherein the amine value of said amino-functional siloxane is about 70 mg KOH/gm.

68. The composition according to claim 55 wherein said amino-functional siloxane is about 0.5 percent by weight of the composition.

69. An aqueous silane composition said composition initially comprising effective amounts of:
(a) a hydrolyzable silane;
(b) a low molecular weight silicone represented by one of

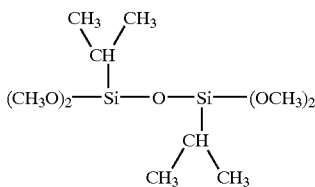

and

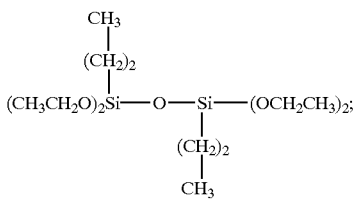

(c) an amino-functional silicone;
(d) an amino-functional silane; and
(e) the balance of water.

70. The composition according to claim 69 wherein said amino-functional silane is initially combined with a non-ionic emulsifier.

71. The composition according to claim 70 wherein said non-ionic emulsifier includes reactive hydroxyl groups.

72. The composition according to claim 70 wherein said non-ionic emulsifier is an ethoxylated alkyl phenol.

73. The composition according to claim 70 wherein said amino-functional silane initially combined with said non-ionic emulsifier is about 0.5 weight percent of the composition.

74. The composition according to claim 70 further including an additional non-ionic emulsifier.

75. The composition according to claim 74 wherein said additional non-ionic emulsifier is between about 2 and 3 percent by weight of the composition.

76. The composition according to claim 69 wherein said hydrolyzable silane is an alkyl-silane.

77. The composition according to claim 76 wherein said hydrolyzable silane is an alkoxy-silane.

78. The composition according to claim 77 wherein said alkoxy-silane is octyl-triethoxy-silane.

79. The composition according to claim 78 wherein said alkoxy-silane is hexyl-trimethoxy-silane.

80. The composition according to claim 69 wherein a combination of said hydrolyzable silane and said low molecular weight silicone is between about 0 and 90 percent by weight of the composition.

81. The composition according to claim 80 wherein a combination of said hydrolyzable silane and said low molecular weight silicone is between about 30 and 90 percent by weight of the composition.

82. The composition according to claim 81 wherein a combination of said hydrolyzable silane and said low molecular weight silicone is between about 35 and 75 percent by weight of the composition.

83. The composition according to claim 69 wherein said low molecular weight silicone is between about 10 and 90 percent by weight of active components comprising said a hydrolyzable silane, a low molecular weight silicone, an amino-functional silicone, and an amino-functional silane.

84. The composition according to claim 83 wherein said low molecular weight silicone is between about 20 and 80 percent by weight of active components comprising said a hydrolyzable silane, a low molecular weight silicone, an amino-functional silicone, and an amino-functional silane.

85. The composition according to claim 84 wherein said low molecular weight silicone is between about 40 and 65 percent by weight of active components comprising said a hydrolyzable silane, a low molecular weight silicone, an amino-functional silicone, and an amino-functional silane.

86. The composition according to claim 69 wherein the amine value of said amino-functional siloxane is between about 50 and 100 mg KOH/gm.

87. The composition according to claim 86 wherein the amine value of said amino-functional siloxane is about 70 mg KOH/gm.

88. The composition according to claim 69 wherein said amino-functional siloxane is about 0.5 percent by weight of the composition.

89. The composition according to claim 74 where said combination of said amino-functional silane with said non-ionic emulsifier is a reaction product of said amino-functional silane and said non-ionic emulsifier.

90. The method according to claim 52 where said combination of said amino-functional silane with said non-ionic emulsifier is a reaction of said amino-functional silane with said non-ionic emulsifier.

91. The method according to claim 54 where said combination of said amino-functional silane with said non-ionic emulsifier is a reaction of said amino-functional silane with said non-ionic emulsifier.

* * * * *